United States Patent Office 3,535,397
Patented Oct. 20, 1970

3,535,397
PROCESS FOR THE CATALYTIC CYCLO-
DIMERIZATION OF 1,3-DIOLEFINS
Herbert Schott, Hofheim, Taunus, Germany, assignor to
Farbwerke Hoechst Aktiengesellschaft vormals Meister
Lucius & Brüning, Frankfurt am Main, Germany, a
corporation of Germany
No Drawing. Filed Apr. 8, 1969, Ser. No. 814,441
Claims priority, application Germany, Apr. 13, 1968,
1,768,213
Int. Cl. C07c *3/10, 13/16, 13/26*
U.S. Cl. 260—666
6 Claims

ABSTRACT OF THE DISCLOSURE

This is a process for the cyclodimerization 1,3-diolefins using a catalyst consisting of cyclopentadienyl-nickel and a phosphorus compound but in the absence of hydrogen or a reducing agent.

---

The present invention relates to a process for the catalytic cyclo-dimerization of 1,3-diolefins.

Various processes have been proposed for the preparation of cyclic dimers of 1,3-diolefins. Thus, the thermal, noncatalytic dimerization of butadiene-1,3 yields a large proportion of 4-vinyl-cyclohexene-1 and a small proportion of cyclooctadiene-1,5.

In the process according to German Pat. 951,213, butadiene-1,3 is reacted to 4-vinylcyclohexene-1 and cyclooctadiene-1,5 in the presence of a nickel compound of the general formula $[(RO)_3P]_xNi(CO)_{4-x}$ as a catalyst. It has also been proposed to prepare catalysts for the cyclodimerization of 1,3-diolefins by reduction of nickel (II) salts in the presence of phosphorus compounds. As reducing agents there are used, according to German Pat. 1,140,569, organometallic compounds and metal hydrides, preferably of metals of main groups I to III of the Mendeleeff Periodic Table, and according to German Pat. 1,126,864 metals, preferably of main groups I to III of the Mendeleeff Periodic Table.

It is also known from German Auslegeschrift 1,224,770 that by heating nickel (II) compounds, containing a reducing anion, for example formiate, in the presence of organophosphorus compounds catalysts are obtained which convert butadiene-1,3 partially into cyclooctadiene-1,5.

According to U.S. Pat. 3,261,875 catalysts for preparing cyclooctadiene-1,5 from conjugated dienes are obtained by hydrogenating a mixture of bis-(cyclopentadienyl)-nickel(II) and triarylphosphine. The ratio between hydrogen and nickel compound must be greater than 1, preferably from 5 to 15.

Now, I have found a process for the catalytic dimerization of 1,3-diolefins, which comprises heating 1,3-diolefins together with the catalysts, in the absence of hydrogen or a reducing agent, to temperatures of from 60° to 400° C., preferably 80° to 150° C., under a pressure of from 0 to 150 atmospheres gage, preferably 0 to 50 atmospheres gage, and then completing the reaction at temperatures of from 0° to 200° C., preferably 50° to 150° C., the catalyst consisting of, (a) a cyclopentadienyl-nickel compound of the general formula $(R^1_n\text{—}C_5H_{5-n})_2Ni$, in which $R^1$ stands for an alkyl group, advantageously an alkyl group containing from 1 to 0 carbon atoms, preferably an alkyl group containing from 1 to 4 carbon atoms, or an aryl group and $n$ is zero or a whole number from 1 to 5, and/or of the general formula $(R^1_n\text{—}C_5H_{5-n})NiXR^2_m$, in which $R^1$ stands for an alkyl group, advantageously an alkyl group containing from 1 to 10 carbon atoms, preferably an alkyl group containing from 1 to 4 carbon atoms, or an aryl group, $n$ is zero or a whole number from 1 to 5, X is a neutralligand or an anion, and $R^2$ stands for a phosphine or a carbon monoxide and $m$ is zero or 1, and in which formulae two neighbouring radicals $R^1$ may be linked to each other in a cyclic manner such that a six-membered ring is annellated to the cyclopentadienyl system, and (b) a phosphorus (III) compound of the general formula $PR_3$, $P(OR)_3$ or $P(NR_2)_3$, in which R stands for an alkyl or an aryl group.

In the case of $R^2$ being a phosphine, the addition of catalyst component $b$ may be dispensed with. By the process in accordance with the invention, butadiene-1,3 may, for example, be converted in a selective manner and with a high yield into cyclooctadiene-1,5.

Starting compounds for the process in accordance with the invention are 1,3-diolefins, for example butadiene1-3 or its alkyl substitution products—the alkyl groups containing from 1 to 4 carbon atoms—which are used alone or in admixture with other substances that are inert under the reaction conditions.

For preparing the catalyst there are used cyclopentadienyl-nickel(II) compounds of the above mentioned general formulae. A neutral neutralligands or anions there are used, for example carbon monoxide, nitrogen monoxide, halide, nitrate, sulfate, acetyl acetonate, hydride, alkyl-, allyl-, and aryl groups. $R^2$ may be, for example, triphenyl-phosphine or tricyclohexyl-phosphine. Suitable compounds are, for example, bis-(cyclopentadienyl)-Nickel(II), bis-(methylcyclopentadienyl)-nickel (II), bis-(ethylcyclopentadienyl)-nickel(II), bis-(propyl-cyclopentadienyl) - nickel(II), bis-(dimethylcyclopentadienyl)-nickel(II), bis - (phenylcyclopentadienyl)-nickel (II), bis-(indenyl)-nickel(II), dimeric cyclopentadienyl-nickel-carbonyl, cyclopentadienyl-nickel-nitrosyl, allyl-nickel(II)-cyclopentadienyl.

By the addition of organic phosphorus (III) compounds the selectivity of the catalyst is considerably increased. To this effect all compounds of trivalent phosphorus may be used, which contain organic radicals R. These radicals may be linked via an oxygen or a nitrogen atom. Such phosphorus compounds are, for example, tri-ethyl-phosphine, tri(n-propyl)-phosphine, tri(i-propyl) phosphine, tri(n-butyl)phosphine, tricyclohexyl-phosphine, triphenyl-phosphine, tritolyl - phosphine, trixylyl-phosphine, trinaphthyl-phosphine, triethyl-phosphite, tri(n-propyl)phosphite, tri(n-butyl)phosphite, triphenyl-phosphite, tri(p-methyl-phenyl)phosphite. There are preferably used aryl-phosphites substituted in the o-position, for example tri(o-methyl-phenyl)phosphite, tri(o-methoxyphenyl)phosphite, tri(o-phenyl-phenyl)phosphite, tri(o-i-propyl-phenyl)phosphite, tri(2,4-ditert.butyl-phenyl)phosphite, tri(α-naphthyl)phosphite, tri(2,4-dimethyl-phenyl) phosphite, tri(2,4,6-trimethyl-phenyl)phosphite and phosphorous acid tripiperidide.

As catalysts there are, furthermore, suitable complex compounds, containing at the same time a nickel(II) and a phosphorus(III) compound, for example triphenyl-phosphine - cyclopentadienyl-nickel(II)-methyl, triphenyl-phosphine-cyclopentadienyl-nickel(II)chloride, triphenyl-phosphine-cyclopentadienyl-nickel(II)-phenyl. A catalyst consisting of bis-(cyclopentadienyl)-nickel(II) and aromatic phosphites substituted in the o-position, is especially preferred. The molar ratio of nickel(II) compounds to phosphorus(III) compounds is within the range of from 1:0.5 to 1:10, preferably 1:1.

During the dimerization reaction the catalyst is present in an amount corresponding to from 0.1 to 10 millimoles of nickel(II) compound per 100 grams of diolefin-1,3.

Very good results are obtained with a catalyst amount containing 0.3 to 3 millimoles of nickel(II) compound per 100 grams of diolefin.

For carrying out the process in accordance with the invention it is necessary to heat the two catalyst components to at least 60° C. in the presence of 1,3-diolefins and, if desired, an inert solvent. Once the reaction has started it may be completed at a temperature within the wide range of from 0° to 200° C., preferably 50° to 150° C. The end of the reaction can be recognized by the beginning decrease in pressure.

The preparation of the catalyst and the carrying out of the reaction may be performed at atmospheric pressure or a superatmospheric pressure which depends on the temperature and the vapor pressure of the 1,3-diolefin and of solvents possibly added and is from 0 to 150 atmospheres gage, preferably 0 to 50 atmospheres gage.

The process in accordance with the invention may be carried out in the presence of inert solvents, such suitable solvents being, for example, aliphatic, cycloaliphatic or aromatic hydrocarbons and ethers. Especially suitable solvents are unsaturated cycloaliphatic hydrocarbons, for example cyclooctadiene-1,5.

The process according to the invention may be carried out in a discontinuous manner such that the catalyst components are placed, if desired, in a solvent or a dispersing agent, in a pressure vessel, the 1,3-diolefin is then introduced under pressure and heated to the desired reaction temperature. After terminating the reaction the products are discharged and separated, for example by distillation.

The process in accordance with the invention may also be carried out continuously by removing the dimerized products obtained by the reaction continuously from the reactor and simultaneously introducing under pressure new catalyst and new 1,3-diolefin. As reaction space there may be used, for example, a heated pressure tube into which the reactants are introduced at one end, while the reaction products are withdrawn at the other end.

The cyclodimerization products obtained by the process in accordance with the invention may be used as starting products for the manufacture of dicarboxylic acids of medium chain length; they also serve as initial products for Nylon 8.

The following examples serve to illustrate the invention but are not intended to limit it:

EXAMPLE 1

0.38 gram of bis-(cyclopentadienyl)-nickel(II) and 1.08 grams of tri-(o-phenyl-phenyl)phosphite, dissolved in 10 grams of benzene, were introduced into a pressure vessel. After introducing under pressure 48 grams of butadiene-1,3 the whole was shaken at 110° to 125° C. for 16 hours. By working up the reaction products by distillation 40.3 grams of volatile butadiene-1,3 oligomers comprising 4.8 grams of 4-vinyl-cyclohexene-1, 34.4 grams of cyclooctadiene-1,5 and 0.1 gram of cyclododecatriene were obtained. In addition to the catalyst, 1.6 grams of higher butadiene oligomers remained behind.

EXAMPLE 2

0.85 gram of bis-(ethyl-cyclopentadienyl)-nickel(II) and 1.05 grams of triphenyl-phosphine were introduced into a pressure vessel together with 15 grams of benzene and 40 grams of butadiene-1,3. Then the starting products were heated to a temperature of 110° to 120° C. for 15 hours. By working up the reaction products 32.4 grams of volatile butadiene-1,3 oligomers comprising 7.5 grams of 4-vinyl-cyclohexene-1, 20.9 grams of cyclooctadiene-1,5 and 1.7 grams of cyclododecatriene were obtained. In addition to the catalyst, 1.6 grams of higher butadiene oligomers remained behind.

EXAMPLE 3

0.58 gram of allyl-(cyclopentadienyl)-nickel(II), 1.9 grams of tri-(o-phenyl-phenyl)phosphite, 20 grams of benzene and 51 grams of butadiene-1,3 were shaken at 115° to 125° C. for 18 hours in an autoclave. By working up by distillation, 42.5 grams of volatile butadiene-1,3 oligomers comprising 5.3 grams of 4-vinylcyclohexene, 35.6 grams of cyclooctadiene-1,5 and 0.2 gram of cyclododecatriene were obtained. In addition to the catalyst, 1.5 grams of higher butadiene-1,3 oligomers remained behind as distillation residue.

EXAMPLE 4

0.70 gram of triphenylphosphine-cyclopentadienyl-nickel(II) chloride and 0.60 gram of tri-(o-methyl-phenyl)phosphite were dissolved in 15 grams of benzene and introduced into a pressure vessel. After introducing under pressure 43 grams of butadiene-1,3, the starting products for the reaction were shaken at 135° to 140° C. for 15 hours. By working up by distillation, 22.1 grams of volatile butadiene-1,3 oligomers comprising 11.3 grams of 4-vinyl-cyclohexene-1, 9.7 grams of cyclooctadiene-1,5 and 0.2 gram of cyclododecatriene were obtained. In addition to the catalyst, 5.8 grams of higher butadiene-1,3 oligomers remained behind.

EXAMPLE 5

1 gram of cyclopentadienyl-nickel-nitrosyl, dissolved in 10 grams of pentane, 3.5 grams of tri-(o-phenyl-phenyl) phosphite and 42 grams of butadiene-1,3 were shaken at 140° C. for 11 hours in a pressure vessel. By working up by distillation, 19.0 grams of volatile butadiene-1,3 oligomers comprising 6.6 grams of 4-vinyl-cyclohexene-1 and 12.0 grams of cyclooctadiene-1,5 were obtained. In addition to the catalyst, a residue of 4.4 grams remained behind.

EXAMPLE 6

0.3 gram of dimeric cyclopentadienyl-nickel-carbonyl, dissolved in 15 grams of diethyl ether, 1.1 grams of tri-(o-phenyl-phenyl) phosphite and 49 grams of butadiene-1,3 were shaken at 130° to 150° C. for 8 hours in a pressure vessel. By working up the reaction products by distillation, 25.4 grams of volatile butadiene-1,3 oligomers and 5.0 grams of non-volatile butadiene-1,3 oligomers were obtained. The volatile butadiene-1,3 oligomers consisted of 4.2 grams of 4-vinylcyclohexene-1, 19.5 grams of cyclooctadiene-1,5 and 0.5 gram of cyclododecatriene.

EXAMPLE 7

The test was carried out in an analogous manner to Example 1, while using, however, 1.7 grams of bis-(cyclopentadienyl)-nickel(II) and 4.8 grams of tri-(o-phenyl-phenyl) phosphite and, instead of butadiene, 56 grams of pentadiene-1,3. By working up by distillation, 34.3 grams of volatile pentadiene-1,3 oligomers containing 25.1 grams of dimethylcyclooctadiene-1,5, were obtained.

What is claimed is:

1. A process for preparing cyclic dimers of 1,3-diolefins, which comprises heating 1,3-diolefins together with the catalysts, in the absence of hydrogen or a reducing agent, to temperatures of from 60° to 400° C., under a pressure of from 0 to 150 atmospheres gage, and then completing the reaction at temperatures of from 0° to 200° C., the catalysts consisting of:

(a) a cyclopentadienyl-nickel compound of the general formula $(R^1_n-C_5H_{5-n})_2Ni$, in which $R^1$ stands for an alkyl or an aryl group, $n$ is zero or a whole number from 0 to 3 and/or of the general formula $[(R^1_n-C_5H_{5-n})]NiXR^2_m$, in which $R^1$ stands for an alkyl group and/or an aryl group, $n$ is zero or a whole number from 0 to 3, X is a neutralligand or an anion, and $R^2$ stands for a phosphine or a carbon monoxide, $m$ is 0 or 1 and in which formulae neighbouring radicals $R^1$ may be linked to each other in a cyclic manner such that a six-membered ring is annellated to the cyclopentadienyl system, and, (b) a phosphorus (III) compound of the general formula $PR_3$, $P(OR)_3$ or $P(NR_2)_3$ in which R stands for an alkyl or an aryl group.

2. A process as claimed in claim 1, wherein as catalyst component (a)

a compound of the general formula $[(R^1_n\!-\!C_5H_{5-n})]\text{-}NiXR^2_m$, in which X stands for an alkyl, an allyl or an aryl group, is used.

3. A process as claimed in claim 1, wherein as catalyst component (b)

an aromatic phosphite substituted in the o-position is used.

4. A process as claimed in claim 1, wherein a catalyst is used, which consists of:

(a) bis-(cyclopentadienyl)-nickel (II) and
(b) an aromatic phosphite substituted in the o-position.

5. A process as claimed in claim 1, wherein butadiene-1,3 is used as 1,3-diolefin.

6. A process as claimed in claim 1, wherein pentadiene-1,3 is used as 1,3-diolefin.

References Cited

UNITED STATES PATENTS

| 3,261,875 | 7/1966 | Pruett | 260—666 |
| 3,201,484 | 8/1965 | Myers | 260—666 |

PAUL M. COUGHLAN, Jr., Primary Examiner

V. O'KEEFE, Assistant Examiner

U.S. Cl. X.R.

252—431